United States Patent
Zhang et al.

(10) Patent No.: US 10,149,241 B2
(45) Date of Patent: Dec. 4, 2018

(54) DEVICE, METHOD, AND SYSTEM FOR STARTING MOBILE HOTSPOT

(71) Applicant: ZTE CORPORATION, Shenzhen, Guangdong Province (CN)

(72) Inventors: Xiaoliang Zhang, Shenzhen (CN); Jin Han, Shenzhen (CN)

(73) Assignee: XI'AN ZHONGXING NEW SOFTWARE CO., LTD (CN)

( * ) Notice: Subject to any disclaimer, the term of this patent is extended or adjusted under 35 U.S.C. 154(b) by 88 days.

(21) Appl. No.: 14/896,119

(22) PCT Filed: Sep. 4, 2013

(86) PCT No.: PCT/CN2013/082913
§ 371 (c)(1),
(2) Date: Dec. 4, 2015

(87) PCT Pub. No.: WO2014/194579
PCT Pub. Date: Dec. 11, 2014

(65) Prior Publication Data
US 2016/0127989 A1  May 5, 2016

(30) Foreign Application Priority Data
Jun. 6, 2013 (CN) .......................... 2013 1 0223363

(51) Int. Cl.
*H04L 29/06* (2006.01)
*H04W 52/02* (2009.01)
(Continued)

(52) U.S. Cl.
CPC ....... *H04W 52/0203* (2013.01); *H04L 63/083* (2013.01); *H04L 63/10* (2013.01);
(Continued)

(58) Field of Classification Search
CPC ....... H04L 63/10; H04L 63/18; H04L 63/083; H04W 4/008; H04W 52/0203;
(Continued)

(56) References Cited

U.S. PATENT DOCUMENTS

2008/0058031 A1* 3/2008 Deprun ............. H04W 52/0229
  455/574
2009/0215398 A1* 8/2009 Adler ...................... H04L 63/08
  455/41.3

(Continued)

FOREIGN PATENT DOCUMENTS

CN 101541068 A 9/2009
CN 102201846 A 9/2011
(Continued)

OTHER PUBLICATIONS

The International Search report and Written Opinion dated Mar. 13, 2014 in Application No. PCT/CN2013/082913.
(Continued)

*Primary Examiner* — Mohammad A Siddiqi
(74) *Attorney, Agent, or Firm* — Plumsea Law Group, LLC

(57) ABSTRACT

Disclosed is a device for starting a mobile hotspot, including: a password sending module, configured to send a Bluetooth pairing password and a preset start password to a mobile terminal that previously accessed a mobile hotspot via WIFI; a working state detecting module, configured to: detect the working state of mobile hotspot; a sleep triggering module, configured to trigger the mobile hotspot to enter into a sleeping state when detecting that the mobile hotspot has no user access and/or no data service; a Bluetooth module, configured to establish a Bluetooth connection with the mobile terminal and receive a password sent by the mobile terminal when the mobile hotspot is in the sleeping state; a start controlling module, configured to compare the (Continued)

password with a locally stored start password and control the mobile hotspot to enter into the working state when the comparison result is that they are consistent.

17 Claims, 3 Drawing Sheets

(51) Int. Cl.
  *H04W 12/06* (2009.01)
  *H04W 4/80* (2018.01)
  *H04W 76/10* (2018.01)
  *H04W 84/12* (2009.01)
  *H04W 88/08* (2009.01)

(52) U.S. Cl.
  CPC ............ *H04W 4/80* (2018.02); *H04W 12/06* (2013.01); *H04W 52/0206* (2013.01); *H04W 52/0235* (2013.01); *H04W 76/10* (2018.02); *H04W 84/12* (2013.01); *H04W 88/08* (2013.01); *Y02D 70/00* (2018.01); *Y02D 70/142* (2018.01); *Y02D 70/144* (2018.01)

(58) Field of Classification Search
  CPC . H04W 52/0235; H04W 76/02; H04W 76/10; H04W 52/0206; H04W 4/80; H04W 12/06; H04W 84/12; H04W 88/08; Y02D 70/142; Y02D 70/144; Y02D 70/00
  See application file for complete search history.

(56) References Cited

U.S. PATENT DOCUMENTS

| | | | |
|---|---|---|---|
| 2011/0028085 A1 | 2/2011 | Waung et al. | |
| 2012/0052793 A1* | 3/2012 | Brisebois .............. | H04W 88/06 455/1 |
| 2012/0309314 A1 | 12/2012 | Chen | |

FOREIGN PATENT DOCUMENTS

| | | |
|---|---|---|
| CN | 102547935 A | 7/2012 |
| CN | 103067954 A | 4/2013 |
| WO | 2008075316 A2 | 6/2008 |

OTHER PUBLICATIONS

European Search Report dated Feb. 26, 2016 in European Patent Application No. EP13886229.7.

* cited by examiner

DEVICE, METHOD, AND SYSTEM FOR STARTING MOBILE HOTSPOT

CROSS-REFERENCE TO RELATED APPLICATION(S)

This application is the U.S. National Phase application of PCT application number PCT/CN2013/082913 having a PCT filing date of Sep. 4, 2013, which claims priority of Chinese patent application 201310223363.7 filed on Jun. 6, 2013, the disclosures of which are hereby incorporated by reference.

TECHNICAL FIELD

The present document relates to the field of mobile communication technologies, and more particularly, to a device, method and system for starting a mobile hotspot.

BACKGROUND OF RELATED ART

Mobile Hotspot is a technical solution in which the 3G/4G network is converted into a WIFI network which is shared by multiple users, its network connection is smooth and easy to use, and has been widely welcomed by users.

Most current mobile hotspots are powered by a battery, and as a high rate data product, the data processing amount of a mobile hotspot is relatively large, and its power consumption is relatively high, if it is in the working state for a long time, the battery will run out in a very short period of time. In order to make the battery of a mobile hotspot last longer per charge, the method commonly used by the current mobile hotspot is that the mobile hotspot powers off by itself or is in the standby state when the user does not use the mobile hotspot. In the standby state, the mobile hotspot will shut down the WIFI to save the power consumption caused by the WIFI broadcast service set identifier (SSID), and preserve the communication with the base station, the processor of the mobile hotspot enters into a low power consumption state, the access function is also shut down. If it is in the power-off state and powered on again, the power-on takes longer time, resulting in poor user experience; if it is in the standby state, once the user's intelligent terminal needs to access to the mobile hotspot via the WIFI, the user cannot gain access because the AP (Access Point) function of the mobile hotspot is shut down, at this time, the user needs to manually start the AP function of the mobile hotspot for the user to gain access. Once the product placement position of the mobile hotspot is not easy to be found, it cannot be started, giving users a lot of inconveniences and having relatively poor user experience.

SUMMARY OF THE INVENTION

The main object of the present document is to provide a method for starting a mobile hotspot to address the technical problem in the related art that the user needs to manually start a mobile hotspot when the mobile hotspot is on standby.

In order to achieve the object of the present document, the present document provides a device for starting a mobile hotspot, comprising:

a password sending module, configured to: send a Bluetooth pairing password and a preset start password to a mobile terminal which previously accessed a mobile hotspot via WIFI;

a working state detecting module, configured to: detect a working state of the mobile hotspot;

a sleep triggering module, configured to: trigger the mobile hotspot to enter into a sleeping state when detecting that the mobile hotspot has no user access and/or no data service;

a Bluetooth module, configured to: establish a Bluetooth connection with the mobile terminal when the mobile hotspot is in the sleeping state, and receive a password sent by the mobile terminal via a Bluetooth device;

a start controlling module, configured to: compare the password with a locally stored start password, and control the mobile hotspot to enter into the working state when a comparison result is that they are consistent.

Preferably, the sleep triggering module is configured to: detect whether there are mobile terminals trying to access the mobile hotspot via the WIFI or not according to a preset time interval, and if no, control all power-consuming modules but the Bluetooth module of the mobile hotspot to enter into the sleeping state.

Preferably, the Bluetooth module comprises:

a scanning unit, configured to: detect whether there is Bluetooth equipment requesting to access or not according to a time cycle;

a controlling unit, configured to: when there is the Bluetooth equipment requesting to access, control the Bluetooth module to enter into the working state; and when there is no Bluetooth equipment requesting to access, control the Bluetooth module to enter into a standby state.

Preferably, the Bluetooth module further comprises:

a power-on signal transceiving unit, configured to: collect a power-on signal of the mobile hotspot and send the power-on signal to the mobile terminal.

The present document further provides a mobile hotspot, which comprises a device for starting a mobile hotspot. The device for starting the mobile hotspot comprises:

a password sending module, configured to: send a Bluetooth pairing password and a preset start password to a mobile terminal which previously accessed a mobile hotspot via WIFI;

a working state detecting module, configured to detect a working state of the mobile hotspot;

a sleep triggering module, configured to: trigger the mobile hotspot to enter into a sleeping state when detecting that the mobile hotspot has no user access and/or no data service;

a Bluetooth module, configured to: establish a Bluetooth connection with the mobile terminal when the mobile hotspot is in the sleeping state, and receive a password sent by the mobile terminal via a Bluetooth device;

a start controlling module, configured to: compare the password with a locally stored start password, and control the mobile hotspot to enter into the working state when the comparison result is that they are consistent.

The present document further provides a method for starting a mobile hotspot, comprising:

sending a Bluetooth pairing password and a preset start password to a mobile terminal which previously accessed a mobile hotspot via WIFI;

detecting a working state of the mobile hotspot;

triggering the mobile hotspot to enter into a sleeping state when detecting that the mobile hotspot has no user access and/or no data service;

establishing a Bluetooth connection with the mobile terminal when the mobile hotspot is in the sleeping state, and receiving a password sent by the mobile terminal via a Bluetooth device;

comparing the password with a locally stored start password, and controlling the mobile hotspot to enter into the working state when the comparison result is that they are consistent.

Preferably, said triggering the mobile hotspot to enter into the sleeping state comprises:

detecting whether there is a mobile terminal trying to access the mobile hotspot via WIFI according to a preset time interval or not, and if no, controlling all power-consuming modules but the Bluetooth module of the mobile hotspot to enter into the sleeping state.

Preferably, said establishing a Bluetooth connection with the mobile terminal when the mobile hotspot is in the sleeping state comprises:

detecting whether there is Bluetooth equipment requesting to access according to a time cycle;

when there is the Bluetooth equipment requesting to access, controlling the Bluetooth module to enter into the working state; and where there is no Bluetooth equipment requesting to access, control the Bluetooth module to enter into a standby state.

Preferably, after controlling the mobile hotspot to enter into the working state, it further comprises:

collecting a power-on signal of the mobile hotspot and sending the power-on signal to the mobile terminal.

The present document further provides a system for starting a mobile hotspot, comprising a mobile terminal and a mobile hotspot, wherein the mobile hotspot comprises a device for starting a mobile hotspot. The device for starting the mobile hotspot comprises:

a password sending module, configured to: send a Bluetooth pairing password and a preset start password to a mobile terminal which previously accessed a mobile hotspot via WIFI;

a working state detecting module, configured to detect the working state of the mobile hotspot;

a sleep triggering module, configured to: trigger the mobile hotspot to enter into a sleeping state when detecting that the mobile hotspot has no user access and/or no data service;

a Bluetooth module, configured to: establish a Bluetooth connection with the mobile terminal when the mobile hotspot is in the sleeping state, and receive a password sent by the mobile terminal via a Bluetooth device;

a start controlling module, configured to: compare the password with a locally stored start password, and control the mobile hotspot to enter into the working state when the comparison result is that they are consistent.

The mobile terminal comprises:

a storing module, configured to: store the Bluetooth pairing password and the start password sent by the mobile hotspot;

a Bluetooth device, configured to: after establishing the connection with the Bluetooth module of the mobile hotspot, send the start password to the mobile hotspot.

Preferably, the mobile terminal further comprises:

a power-on signal obtaining module, configured to: obtain a power-on signal sent by the mobile hotspot;

a WIFI triggering module, configured to: start a WIFI module of the present mobile terminal according to the power-on signal, and access the mobile hotspot.

Preferably, the mobile terminal further comprises: a WIFI recording module, configured to: after the mobile terminal successfully accesses the mobile hotspot, record a mobile hotspot access password, to automatically access the mobile hotspot for the next time.

Preferably, the mobile hotspot further comprises:

a Bluetooth device controlling module, configured to: when the mobile terminal accesses the mobile hotspot, control the Bluetooth device to be shut down.

The mobile hotspot in the embodiment of the present invention triggers the mobile hotspot to enter into the sleeping state when detecting that the mobile hotspot has no user access and/or no data service; it establishes a Bluetooth connection with the mobile terminal when the mobile hotspot is in the sleeping state, receives the password sent by the mobile terminal via the Bluetooth device, compares the password with the locally stored start password, and controls the mobile hotspot to enter into the working state when the comparison result is that they are consistent.

Object implementations, functions and features and advantages of the patent document will be further described in conjunction with the embodiments and with reference to the accompanying drawings.

PREFERRED EMBODIMENTS OF THE INVENTION

It should be understood that the specific embodiments described herein are only for explaining the patent document and are not intended to limit the patent document.

Figure 1:
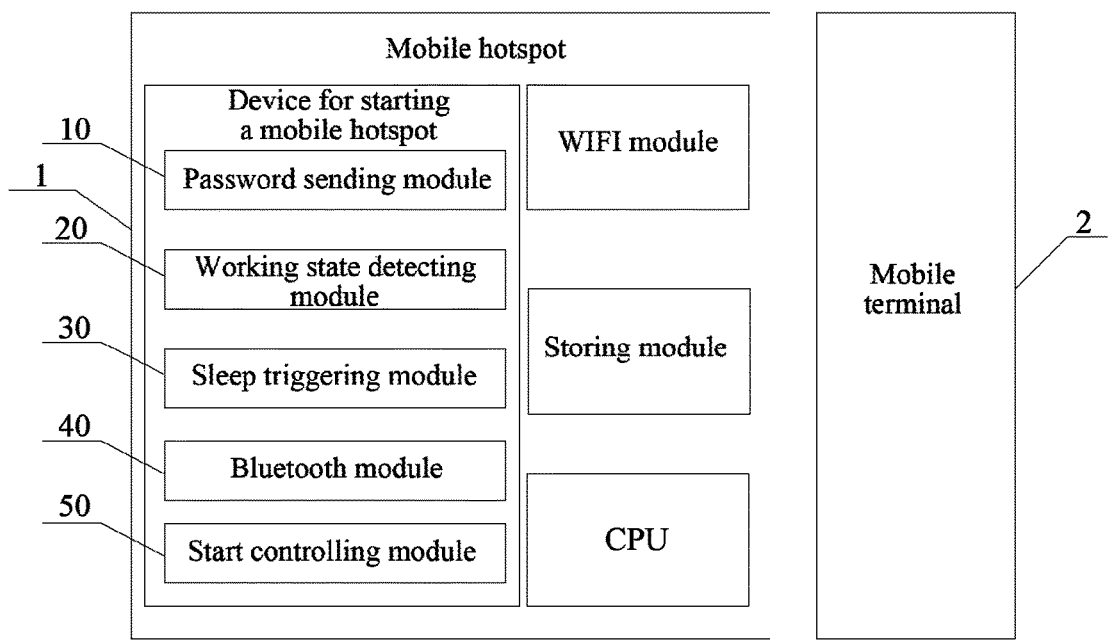
FIG. 1 is a schematic diagram of the structure of a device for starting a mobile hotspot in accordance with an embodiment of the present invention.

Refer to FIG. 1, and FIG. 1 is a schematic diagram of the structure of a device for starting a mobile hotspot in accordance with an embodiment of the present invention. In this embodiment, the control device of the mobile hotspot 1 comprises:

a password sending module 10, used to send a Bluetooth pairing password and a preset start password to mobile terminal 2 which previously accessed the mobile hotspot 1 via WIFI;

a working state detecting module 20, used to detect the working state of the mobile hotspot 1;

a sleep triggering module 30, used to trigger the mobile hotspot 1 to enter into the sleeping state when detecting that the mobile hotspot 1 has no user access and/or no data service;

a Bluetooth module 40, used to: establish a Bluetooth connection with the mobile terminal 2 when the mobile hotspot 1 is in the sleeping state, and receive a password sent by the mobile terminal 2 via a Bluetooth device;

a start controlling module 50, used to compare the password with a locally stored start password, and control the mobile hotspot 1 to enter into the working state when a comparison result is that they are consistent.

In the embodiments of the present invention, a user may preset a start password for the mobile hotspot 1 and store it in the mobile hotspot 1. At the first time of the mobile terminal 2 accessing the mobile hotspot 1, the mobile hotspot 1 sends the start password and the Bluetooth pairing password to the mobile terminal 2, and the mobile terminal 2 saves the start password and the Bluetooth pairing password to access the mobile hotspot 1 at the next time.

In order to make the mobile hotspot stay in the low power-consuming state to save the power for the user, it may detect the state of the mobile hotspot before starting the mobile hotspot, to control the mobile hotspot to stay in the sleeping state according to the detection result. The sleep triggering module 30 triggers the mobile hotspot 1 to enter into the sleeping state when the mobile hotspot 1 does not have the WIFI terminal access and/or the system protocol stack does not continue the data service, and when the mobile hotspot 1 enters in the sleeping state, the CPU of the mobile hotspot 1 operates at a very low power, and the WIFI module is shut down, the timer is stopped, the CPU enters into a slow clock state, and the screen and other power-consuming modules of the mobile hotspot 1 are also shut down.

When the mobile hotspot 1 is in the sleeping state, the Bluetooth module 40 scans the surrounding Bluetooth equipment, and when there are other Bluetooth equipment (such as mobile terminals) accessing the mobile hotspot 1, it performs a Bluetooth pairing with other Bluetooth equipment. After the pairing is successful, the mobile terminal 2 sends the start password to the mobile hotspot 1 via the Bluetooth equipment. The start controlling module 50 compares the start password sent by the mobile terminal 2 with the start password stored by the mobile hotspot 1, and if they are consistent, the Bluetooth module 40 of the mobile hotspot 1 sends a command to the CPU of the mobile hotspot 1, to start the CPU and the WIFI module, lighten the LCD screen and make the mobile hotspot 1 enter into the working state.

In the embodiment of the present invention, it can trigger starting the mobile hotspot 1 subsequently when the mobile hotspot 1 is in the sleeping state as long as the user successfully accesses the mobile hotspot 1 at the first time by presetting a start password and sending the start password to the mobile terminal which has accessed via the WIFI, and using the Bluetooth technology to receive the start password sent by the mobile terminal when the mobile hotspot enters into the sleeping state, and comparing the password to verify the user's identity. The patent document can achieve controlling the start of a mobile hotspot in a short distance without the user manually starting the mobile hotspot, thus improving the user experience, while further reducing the power consumption of the mobile hotspot on standby, extending the using time of user and having a very good application prospect.

In the embodiments of the present invention, the sleep triggering module 30 may further be used to: detect whether the mobile terminal 2 is trying to access the mobile hotspot 1 via the WIFI according to a preset time interval, and if no, control all power-consuming modules but the Bluetooth module 40 of the mobile hotspot 1 to enter into the sleeping state. For example, the sleep triggering module 30 detects that there is no WIFI user access over a certain time period, and it initiates a sleeping request to the start controlling module 50, and after the start controlling module 50 receives the sleeping request, it controls the CPU to enter into the sleeping state. In addition, the sleep triggering module 30 may also detect the system protocol stack, and if the system protocol stack does not continue the data service, it also sends a sleeping request to the start controlling module 50.

Figure 2:
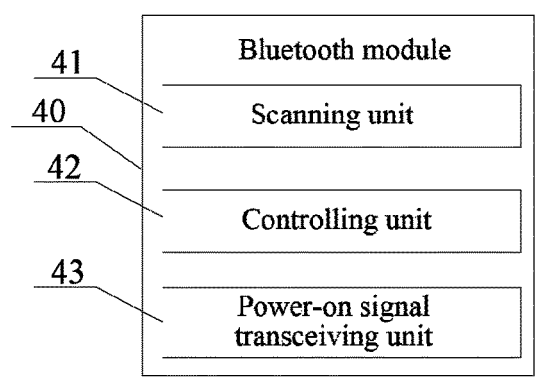
FIG. 2 is a schematic diagram of the structure of a Bluetooth module in accordance with an embodiment of the present invention.

Referring to FIG. 2, in another embodiment of the present invention, the Bluetooth module 40 comprises:

a scanning unit 41, used for detecting whether there is the Bluetooth equipment requesting to access or not according to the time cycle;

a controlling unit 42, used for controlling the Bluetooth module 40 to enter into the working state when there is the Bluetooth equipment requesting to access; and controlling the Bluetooth module 40 to enter into the standby state when there is no Bluetooth equipment requesting to access.

In the embodiment of the present invention, the Bluetooth module 40 entering into the standby state is that the main power-consuming modules, such as the CPU, of the Bluetooth module 40 enter into a low power-consuming state. Taking into account that the Bluetooth module 40 being in the working state for a long time also consume a lot of power, the embodiment of the present invention controls the Bluetooth module 40 to enter into the standby state to reduce the power consumption of the mobile hotspot when there is no Bluetooth equipment requesting to access.

Furthermore, in the embodiment of the present invention, the Bluetooth module 40 may further comprise: a power-on signal transceiving unit 43, used for collecting the power-on signal of the mobile hotspot 1 and sending it to the mobile terminal 2. In the embodiment of the present invention, after the mobile hotspot 1 enters into the working state, the CPU of the mobile hotspot 1 can output the power-on signal to the Bluetooth module 40, and the power-on signal transceiving unit 43 in the Bluetooth module 40 collects the power-on signal and sends it to the mobile terminal 2, in order to inform the mobile terminal 2 that the mobile hotspot 1 has been in the working state and can be accessed.

The embodiment of the present invention further provides a mobile hotspot, which comprises the abovementioned device for starting a mobile hotspot. In the embodiment of the present invention, the structure block diagram and working principle of the device for starting a mobile hotspot can refer to FIGS. 1 and 2 and their corresponding embodiments, including all the technical features of the aforementioned embodiments, which will not be repeated here. Due to the abovementioned device for starting the mobile hotspot, the mobile hotspot according to the patent document can achieve the start in a short distance without the user manually starting the mobile hotspot, thus improving the user experience, further reducing power consumption of the Mobile Hotspot on standby, extending the using time of user, and having a very good application prospect.

Figure 3:
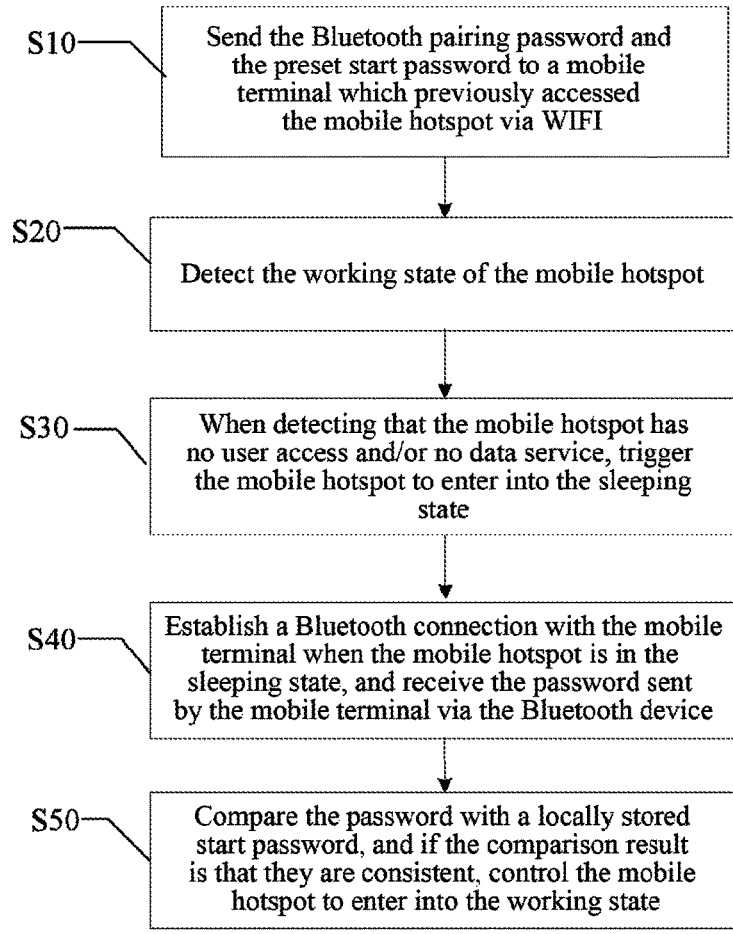
FIG. 3 is a process schematic diagram of a method for starting a mobile hotspot in accordance with an embodiment of the present invention.

The embodiment of the present invention further provides a method for starting a mobile hotspot, wherein the method can be achieved based on the abovementioned mobile hotspot, referring to FIG. 3, in one embodiment of the present invention, the method for starting a mobile hotspot comprises the following steps:

in step S10, it is to send the Bluetooth pairing password and the preset start password to a mobile terminal which previously accessed the mobile hotspot via WIFI; in the embodiment of the present invention, the user can preset a start password for the mobile hotspot and store it in the mobile hotspot 1. At the first time of the mobile terminal accessing the mobile hotspot, the mobile hotspot sends the Bluetooth pairing password and the start password to the mobile terminal, and the mobile terminal stores the start password for accessing the mobile hotspot at the next time.

In step S20, it is to detect the working state of the mobile hotspot; in order to make the mobile hotspot in a low power-consuming state and save power for the user, before starting the mobile hotspot, it can detect the state of the mobile hotspot so as to control the mobile hotspot to be in the sleeping state according to the detection result.

In step S30, when detecting that the mobile hotspot has no user access and/or no data service, it is to trigger the mobile hotspot to enter into the sleeping state; in the case that the mobile hotspot is detected to have no user access and/or no data service, it is to trigger the mobile hotspot to enter into the sleeping state. When the mobile hotspot enters into the sleeping state, the CPU of the mobile hotspot runs at a very low power, the WIFI module is shut down, the timer is stopped, the CPU enters into the slow clock state, and the screen and other power-consuming modules of the mobile hotspot are also shut down.

In step S40, it is to establish a Bluetooth connection with the mobile terminal when the mobile hotspot is in the sleeping state, and receive a password sent by a mobile terminal via the Bluetooth device; the Bluetooth module of the mobile hotspot scans the surrounding Bluetooth devices when the mobile hotspot is in the sleeping state. When other Bluetooth equipment (such as mobile terminals) tries to access the mobile hotspot, it is to perform a Bluetooth pairing with other Bluetooth equipment. After the pairing is successful, the mobile terminal can send the start password to the mobile hotspot via the Bluetooth equipment.

In step S50, it is to compare the password with a locally stored start password, and if the comparison result is that they are consistent, it is to control the mobile hotspot to enter into the working state. For example, the start controlling module in the device for starting a mobile hotspot compares the start password sent by the mobile terminal with the start password stored by the mobile hotspot, and if they are consistent, the Bluetooth module of the mobile hotspot sends a command to the CPU of the mobile hotspot, starts the CPU and the WIFI module, lightens the LCD screen to make the mobile hotspot enter into the working state.

In the embodiment of the present invention, triggering the mobile hotspot to enter into the sleeping state comprises:
detecting whether there is the mobile terminal trying to access the mobile hotspot via the WIFI or not according to a preset time interval, and if no, controlling all power-consuming modules but the Bluetooth module of the mobile hotspot to enter into the sleeping state. For example, the sleep triggering module detects that there are no WIFI user access over a certain time period, and it initiates a sleeping request to the start controlling module 50, and after the start controlling module receives the sleeping request, it controls the CPU to enter into the sleeping state. In addition, the sleep triggering module may also detect the system protocol stack, and it also sends a sleeping request to the start controlling module if the system protocol stack does not continue the data service.

Figure 4:
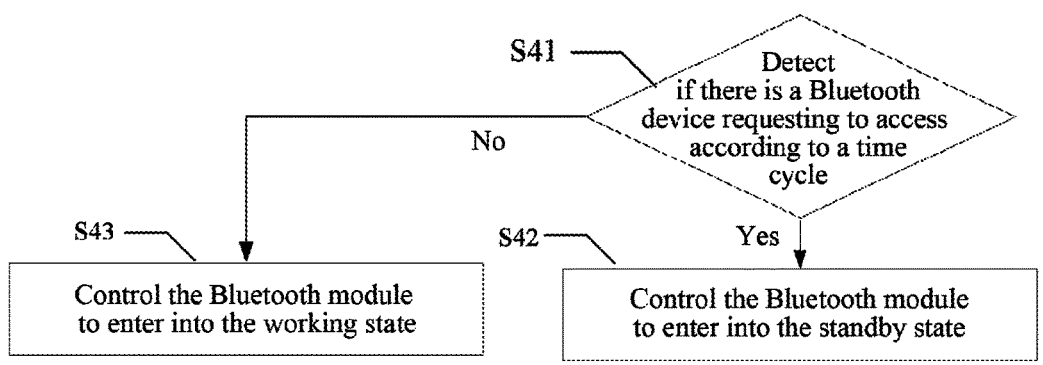
FIG. 4 is a schematic diagram of a working process of establishing a Bluetooth connection with a mobile terminal when a mobile hotspot is in a sleeping state in accordance with an embodiment of the present invention.

Referring to FIG. 4, in the embodiment of the present invention, the abovementioned step S40 may comprise:

in step S41, it is to detect whether there is the Bluetooth equipment requesting to access or not according to a time cycle;
in step S42, it is to control the Bluetooth module to enter into the working state when there is the Bluetooth equipment requesting to access; and
in step S43, it is to control the Bluetooth module to enter into the standby state when there is no Bluetooth equipment requesting to access.

In the embodiment of the present invention, the Bluetooth module entering into the standby state means that the main power-consuming modules, such as the CPU, of the Bluetooth module enter into a low power-consuming state. Taking into account that the Bluetooth module being in the working state for a long time also consumes a lot of power, the embodiment of the present invention controls the Bluetooth module to enter into the standby state to reduce power consumption of the mobile hotspot when there is no Bluetooth equipment requesting to access.

In one preferred embodiment, after controlling the mobile hotspot to enter into the working state, it further comprises:
collecting a power-on signal of the mobile hotspot and sending it to the mobile terminal.

In the embodiment of the present invention, after the mobile hotspot enters into the working state, the CPU of the mobile hotspot can output a power-on signal to the Bluetooth module, and the power-on signal transceiving unit in the Bluetooth module collects the power-on signal and sends it to the mobile terminal to notify the mobile terminal that the Mobile Hotspot has been in the working state and can be accessed.

Figure 5:
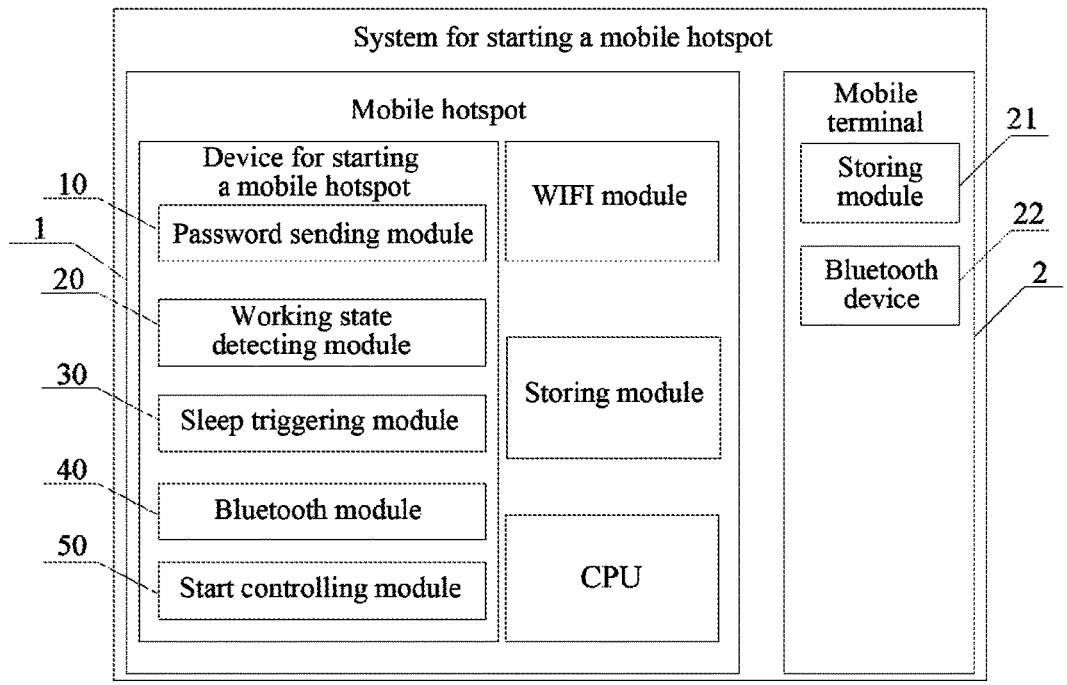
FIG. 5 is a schematic diagram of the structure of a system for starting a mobile hotspot in accordance with an embodiment of the present invention.

The patent document further provides a system for starting a mobile hotspot, and as shown in FIG. 5, the control system comprises the abovementioned mobile terminal 2 and mobile hotspot 1, and the mobile hotspot 1 comprises the abovementioned device for starting a mobile hotspot. In the embodiment of the present invention, the structural block diagram and working principle of the device for starting a mobile hotspot may refer to FIGS. 1 and 2 and their corresponding embodiments, including all the technical features of the abovementioned embodiments, which will not be repeated here.

In the embodiment of the present invention, the mobile terminal 2 comprises:
a storing module 21, used for storing a Bluetooth pairing password and a start password sent by the mobile hotspot 1;
a Bluetooth device 22, used for sending the start password to the mobile hotspot 1 after establishing a connection with the Bluetooth module of the mobile hotspot.

In the embodiments of the present invention, the mobile terminal 2 can be a mobile phone, a tablet computer and so on, and at the first time of accessing the mobile hotspot, the mobile terminal 2 searches for surrounding WIFI signals and searches out a WIFI signal transmitted by the mobile hotspot, inputs the access password, saves this password and accesses the mobile hotspot 1. After accessing the mobile hotspot 1 via the WIFI at the first time, the mobile hotspot 1 sends a Bluetooth pairing password and a start password to the mobile terminal 2, at this time, the storing module 21 in the mobile terminal 2 saves the Bluetooth pairing password and the start password. At the next time of accessing the mobile hotspot 1, if the mobile hotspot 1 is in the sleeping state, the Bluetooth device 22 establishes a connection with the Bluetooth module 40 of the mobile hotspot 1 via the Bluetooth pairing password and sends the start password to the mobile hotspot 1 to start the mobile hotspot 1.

Figure 6:
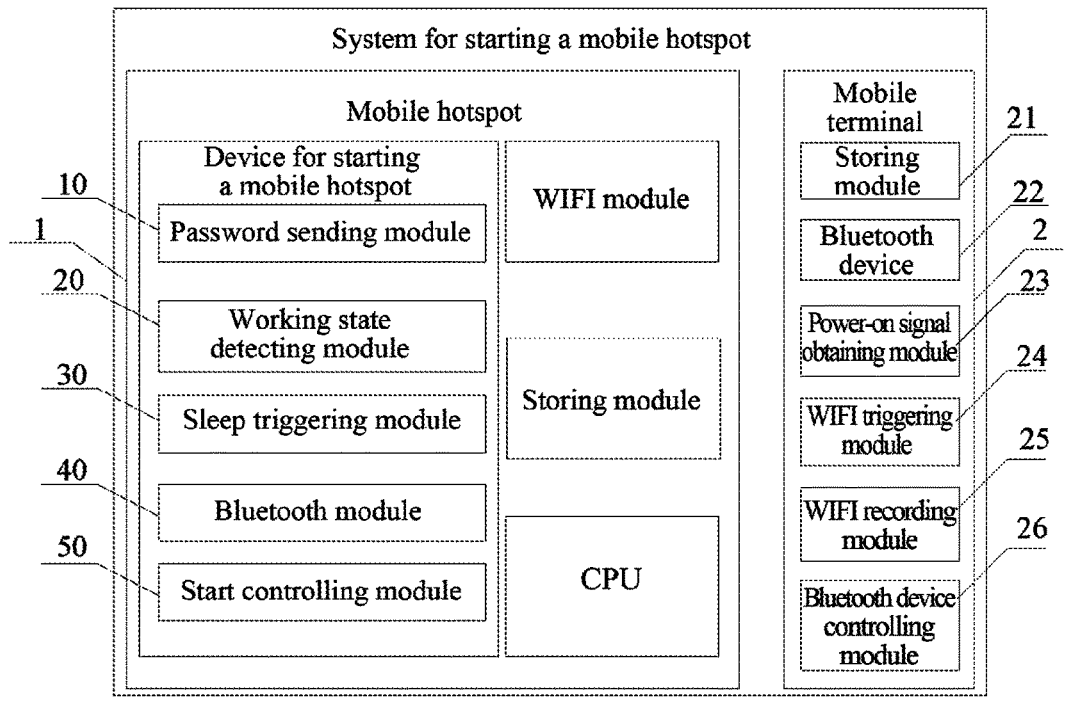
FIG. 6 is a schematic diagram of the structure of the system for starting a mobile hotspot in accordance with another embodiment of the present invention.

Referring to FIG. 6, in one embodiment of the present invention, the mobile terminal 2 further comprises:
- a power-on signal obtaining module 23, used for obtaining the power-on signal transmitted by the mobile hotspot;
- a WIFI triggering module 24, used for starting the WIFI module of the present mobile terminal according to the power-on signal, and accessing the mobile hotspot.

In the embodiment of the present invention, the power-on signal obtaining module 23 obtains the power-on signal sent by the mobile hotspot 1 and judges whether the WIFI module of the Mobile Hotspot is turned on or not, and the local WIFI device of the mobile terminal 2 is started if the WIFI module has been already turned on, searching for the WIFI signal of the mobile hotspot 1, inputting the WIFI access password of the mobile hotspot and accessing the mobile hotspot.

In the present embodiment, the mobile terminal 2 further comprises:
- a WIFI recording module 25, used for recording the access password of the mobile hotspot 1 after the mobile terminal 2 accesses the mobile hotspot 1 successfully, so as to automatically access the mobile hotspot 1 at the next time. In the embodiment of the present invention, since the WIFI recording module 25 is provided, the mobile terminal 2 can automatically access the mobile hotspot 1 when accessing the mobile hotspot 1 via the WIFI at the next time, the accessing process is simpler and more convenient, thus further enhancing the user experience.

In the embodiment of the present invention, the mobile terminal 2 further comprises a Bluetooth device controlling module 26 for controlling the Bluetooth device to be shut down when the mobile terminal 2 accesses the mobile hotspot 1. Since the mobile terminal 2 has accessed the mobile hotspot 1 via the WIFI, the communication between the two parties can be achieved through the WIFI, and therefore, the embodiment of the present invention sets the Bluetooth device control module 26 to control to shut down the Bluetooth device of the mobile terminal 2 to achieve the energy-saving of the mobile terminal 2.

The above is only preferred embodiments of the present invention is not intended to limit the claims of the patent document, any equivalent structures or equivalent process transformation made by using the contents of the specification and the accompanying drawings of the patent document, directly or indirectly used in other related fields of technologies, should be similarly included within the patent protection scope of the patent document.

INDUSTRIAL APPLICABILITY

Compared with the related art, the embodiment of the present invention can achieve controlling the start of a mobile hotspot in a short distance without the user manually starting the mobile hotspot, thus improving the user experience, while further reducing the power consumption of the mobile hotspot on standby, extending the using time of user and having a very good application prospect.

What is claimed is:

1. A device for starting a mobile hotspot, comprising a hardware Bluetooth module, a processor and a storage device, wherein the storage device stores processor-executable programs, and the programs cause the processor to perform the following:
- sending a Bluetooth pairing password and a preset start password to a mobile terminal which previously accessed a mobile hotspot via WIFI;
- detecting a working state of the mobile hotspot;
- triggering the mobile hotspot to enter into a sleeping state when detecting that the mobile hotspot has no user access and/or no data service;
- establishing a Bluetooth connection with the mobile terminal by the hardware Bluetooth module when the mobile hotspot is in the sleeping state, and receiving a current start password sent by the mobile terminal via a hardware Bluetooth device in the mobile terminal to start the mobile hotspot;
- comparing the current start password sent by the mobile terminal with a locally stored start password, and controlling the mobile hotspot to enter into the working state and the WIFI will be started when a comparison result is that the current start password sent by the mobile terminal and the locally stored start password match,
- detecting whether there is other hardware Bluetooth equipment requesting to access the mobile hotspot or not according to a time cycle;
- when there is the other hardware Bluetooth equipment requesting to access the mobile hotspot, controlling the hardware Bluetooth module to enter into the working state; and when there is no other hardware Bluetooth equipment requesting to access the mobile hotspot, control the hardware Bluetooth module to enter into a standby state.

2. The device for starting a mobile hotspot of claim 1, wherein the programs further cause the processor to perform the following: detecting whether there is another mobile terminal trying to access the mobile hotspot via the WIFI or not according to a preset time interval, and if no, control all power-consuming modules but the hardware Bluetooth module of the mobile hotspot to enter into the sleeping state.

3. The device for starting a mobile hotspot of claim 2, wherein the programs further cause the processor to perform the following:
- collecting a power-on signal of the mobile hotspot and send the power-on signal to the mobile terminal.

4. The device for starting the mobile hotspot of claim 2, wherein the device for starting the mobile hotspot is located in the mobile hotspot.

5. The device for starting a mobile hotspot of claim 1, wherein the programs further cause the processor to perform the following:
- collecting a power-on signal of the mobile hotspot and send the power-on signal to the mobile terminal.

6. The device for starting the mobile hotspot of claim 5, wherein the device for starting the mobile hotspot is located in the mobile hotspot.

7. The device for starting the mobile hotspot of claim 1, wherein the device for starting the mobile hotspot is located in the mobile hotspot.

8. The device for starting a mobile hotspot of claim 1, wherein the programs further cause the processor to perform the following:
- collecting a power-on signal of the mobile hotspot and send the power-on signal to the mobile terminal.

9. The device for starting the mobile hotspot of claim 1, wherein the device for starting the mobile hotspot is located in the mobile hotspot.

10. A method for starting a mobile hotspot, comprising:
sending a Bluetooth pairing password and a preset start password to a mobile terminal which previously accessed a mobile hotspot via WIFI;
detecting a working state of the mobile hotspot;
triggering the mobile hotspot to enter into a sleeping state when detecting that the mobile hotspot has no user access and/or no data service;
establishing a Bluetooth connection with the mobile terminal by a hardware Bluetooth module of the mobile hotspot when the mobile hotspot is in the sleeping state, and receiving a current start password sent by the mobile terminal via a hardware Bluetooth device in the mobile terminal to start the mobile hotspot;
comparing the current start password sent by the mobile terminal with a locally stored start password, and controlling the mobile hotspot to enter into the working state and the WIFI will be started when a comparison result is that the current start password sent by the mobile terminal and the locally stored start password match,
wherein said establishing a Bluetooth connection with the mobile terminal when the mobile hotspot is in the sleeping state comprises:
detecting whether there is other hardware Bluetooth equipment requesting to access the mobile hotspot or not according to a time cycle;
when there is the other hardware Bluetooth equipment requesting to access the mobile hotspot, controlling the hardware Bluetooth module to enter into the working state; and
where there is no other hardware Bluetooth equipment requesting to access the mobile hotspot, controlling the hardware Bluetooth module to enter into a standby state.

11. The method for starting a mobile hotspot of claim 10, wherein said triggering the mobile hotspot to enter into the sleeping state comprises:
detecting whether there is another mobile terminal trying to access the mobile hotspot via WIFI according to a preset time interval, and if no, controlling all power-consuming modules but the hardware Bluetooth module of the mobile hotspot to enter into the sleeping state.

12. The method for starting a mobile hotspot of claim 10, wherein after controlling the mobile hotspot to enter into the working state, the method further comprises:
collecting a power-on signal of the mobile hotspot and sending the power-on signal to the mobile terminal.

13. A system for starting a mobile hotspot, comprising a mobile terminal and a mobile hotspot, wherein the mobile hotspot comprises a device for starting the mobile hotspot, the device for starting a mobile hotspot comprising a hardware Bluetooth module, a first processor and a first storage device, wherein the first storage device stores processor-executable programs, and the programs cause the processor to perform the following:
sending a Bluetooth pairing password and a preset start password to a mobile terminal which previously accessed a mobile hotspot via WIFI;
detecting a working state of the mobile hotspot;
triggering the mobile hotspot to enter into a sleeping state when detecting that the mobile hotspot has no user access and/or no data service;
establishing a Bluetooth connection with the mobile terminal by the hardware Bluetooth module when the mobile hotspot is in the sleeping state, and receive a current start password sent by the mobile terminal via a hardware Bluetooth device in the mobile terminal to start the mobile hotspot;
comparing the current start password sent by the mobile terminal with a locally stored start password, and control the mobile hotspot to enter into the working state and the WIFI will be started when a comparison result is that the current start password sent by the mobile terminal and the locally stored start password match;
detecting whether there is other hardware Bluetooth equipment requesting to access the mobile hotspot or not according to a time cycle;
when there is the other hardware Bluetooth equipment requesting to access the mobile hotspot, controlling the Bluetooth module to enter into the working state; and when there is no other hardware Bluetooth equipment requesting to access the mobile hotspot, control the Bluetooth module to enter into a standby state;
the mobile terminal comprising a second processor and a second storage device, wherein the second storage device stores processor-executable programs, and the programs in the second storage device cause the second processor to perform the following:
storing the Bluetooth pairing password and the preset start password sent by the mobile hotspot;
and the hardware Bluetooth device being configured to: after establishing the connection with the hardware Bluetooth module of the mobile hotspot, send the current start password to the mobile hotspot.

14. The system for starting a mobile hotspot of claim 13, wherein the programs in the second storage device further cause the processor to perform the following:
obtaining a power-on signal sent by the mobile hotspot;
starting a WIFI module of the present mobile terminal according to the power-on signal and access the mobile hotspot.

15. The system for starting a mobile hotspot of claim 14, wherein the programs in the second storage device further cause the processor to perform the following: after the mobile terminal successfully accesses the mobile hotspot, recording a mobile hotspot access password, to automatically access the mobile hotspot at the next time.

16. The system for starting a mobile hotspot of claim 15, wherein the programs in the second storage device further cause the processor to perform the following:
when the mobile terminal accesses the mobile hotspot, controlling the hardware Bluetooth device to be shut down.

17. The system for starting a mobile hotspot of claim 14, wherein the programs in the second storage device further cause the processor to perform the following:
when the mobile terminal accesses the mobile hotspot, controlling the hardware Bluetooth device to be shut down.

* * * * *